Dec. 15, 1942.　　G. W. SCHATZMAN　　2,305,110
AUTOMOBILE WHEEL LOCK ASSEMBLY
Filed March 4, 1942　　3 Sheets-Sheet 1
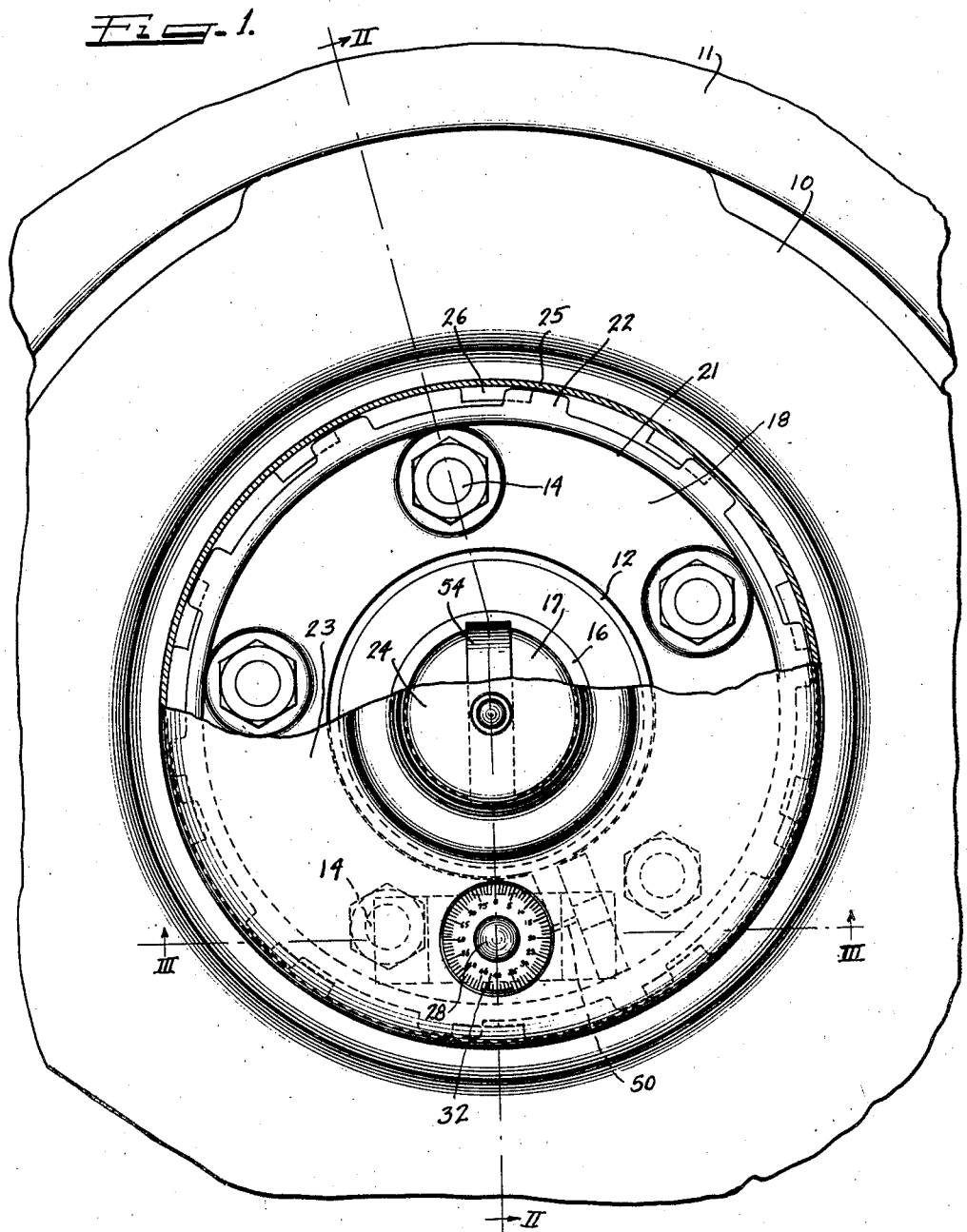
Inventor
GEORGE W. SCHATZMAN

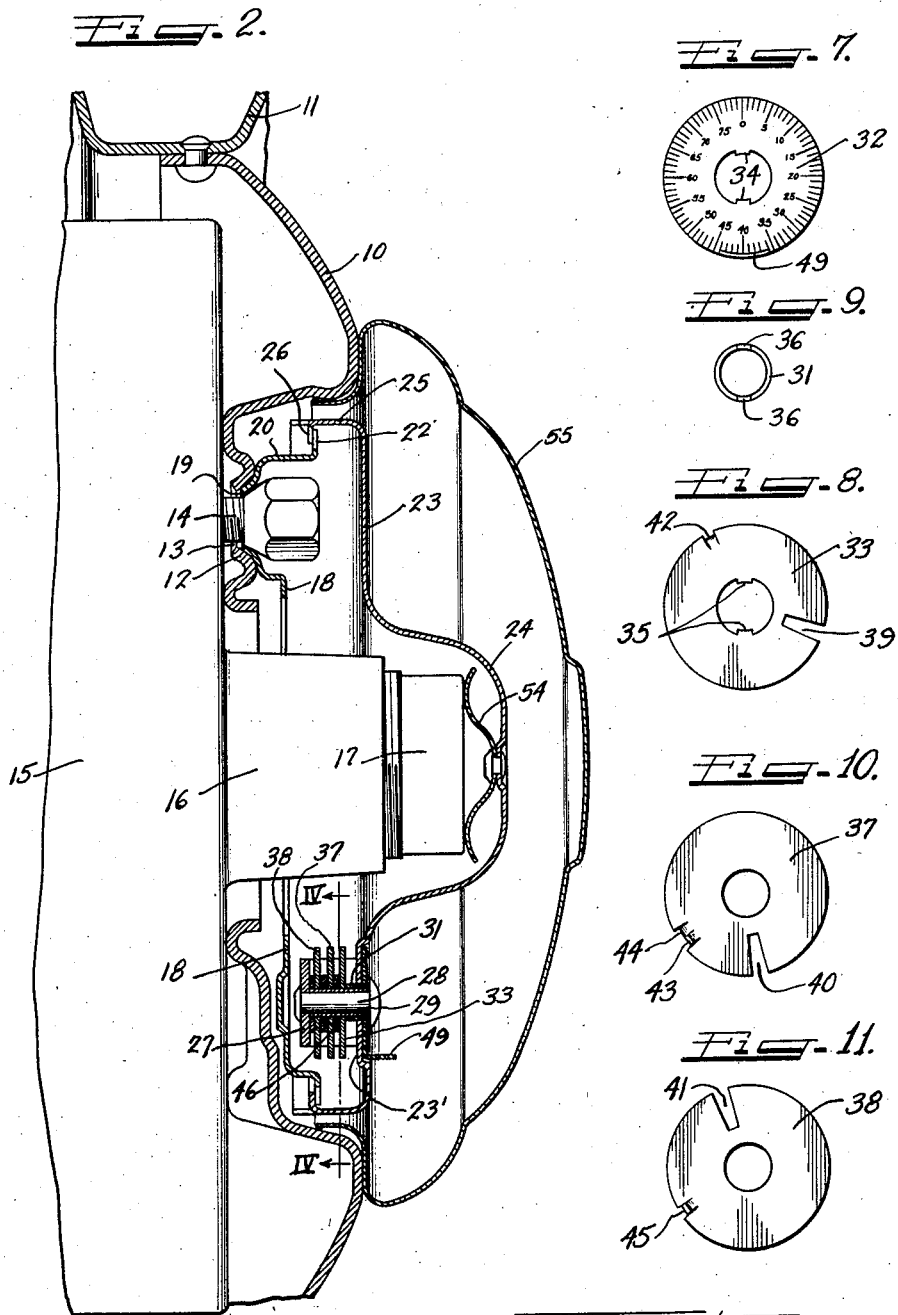

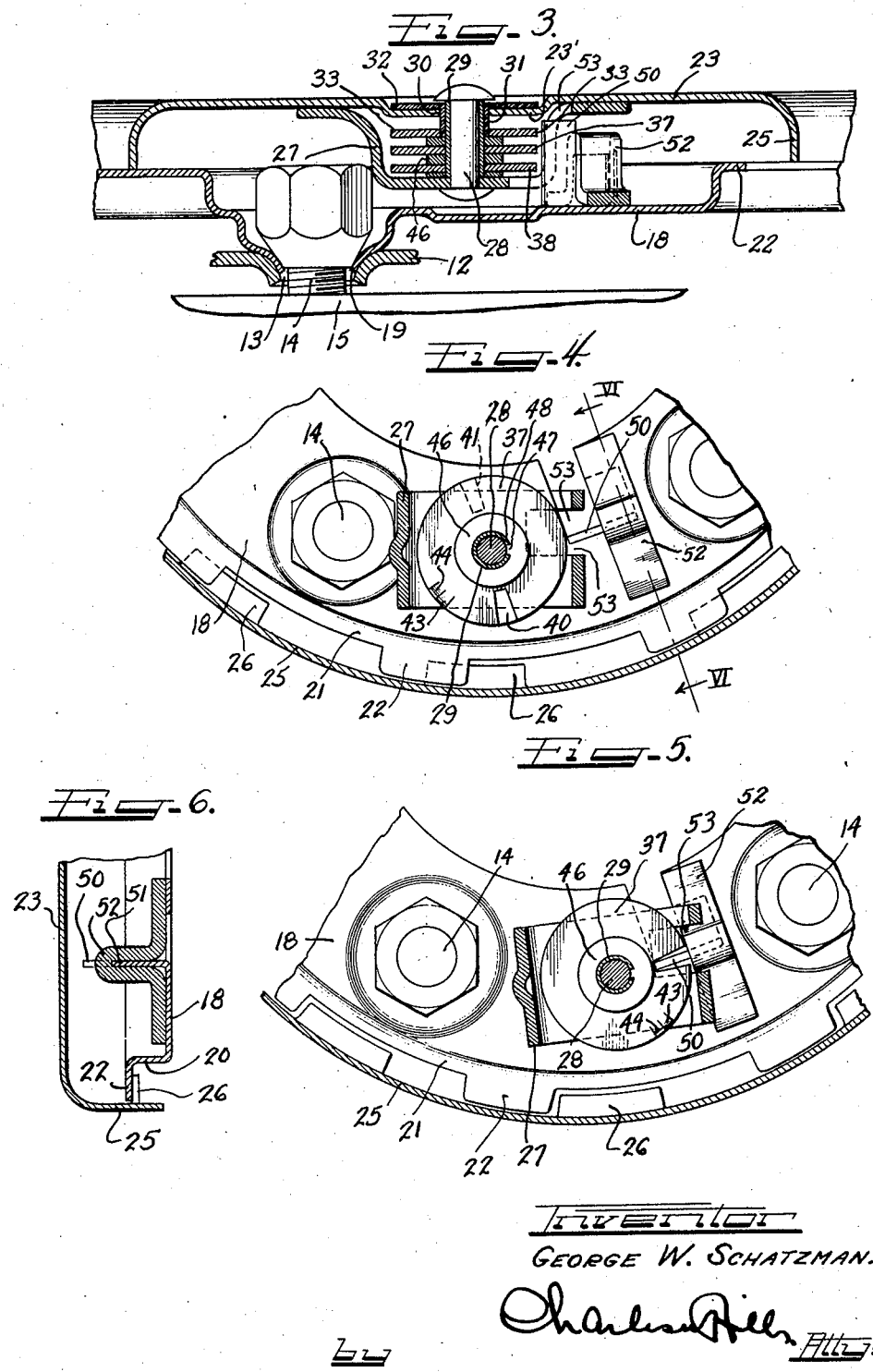

Patented Dec. 15, 1942

2,305,110

UNITED STATES PATENT OFFICE 2,305,110

AUTOMOBILE WHEEL LOCK ASSEMBLY

George W. Schatzman, Detroit, Mich., assignor to Houdaille-Hershey Corporation, Detroit, Mich., a corporation of Michigan Application March 4, 1942, Serial No. 433,275

4 Claims. (Cl. 70—171)

This invention relates to lock assembly for automobile wheels for frustrating removal of a wheel from its supporting hub structure, or the entire hub structure with the wheel from the supporting axle.

An important object of the invention is to provide a lock assembly comprising a keeper member which may be secured to the wheel by the same bolts which secure the wheel to its supporting hub, and a locking cover having interlocking connection with the keeper member to form therewith an enclosure for the wheel securing bolts and the end of the wheel hub and hub cap thereon so as to frustrate access to the bolts for removal of the wheel from its hub structure, or access to the hub cap for removal thereof for releasing the spindle bolt for removal of the hub structure and wheel from the spindle.

A further important object is to provide improved lock mechanism, of the commutation or combination type, for holding the locking cover in interlocking engagement with the keeper member.

The invention also involves other features of construction and arrangement, all of the various features of the invention being embodied in the structure shown on the drawings, in which:

Figure 1 is a front elevation of the central portion of a wheel structure showing the lock assembly applied thereto and with the locking cover partly broken away;

Figure 2 is a section on plane II—II of Figure 1;

Figure 3 is an enlarged section on plane III—III of Figure 1;

Figure 4 is an enlarged section on plane IV—IV of Figure 2 showing the lock assembly in locking position;

Figure 5 is a section similar to Figure 4 showing the locking assembly in unlocking condition;

Figure 6 is a section on plane VI—VI of Figure 4 which would be an enlarged section on plane VI—VI of Figure 1;

Figure 7 is a front elevation of the lock dial;

Figure 8 is a front elevation of the outer locking disk;

Figure 9 is an end view of a sleeve for coupling the dial to the outer disk;

Figures 10 and 11 are respectively front elevations of the intermediate and inner locking disks.

The wheel structure shown comprises the sheet metal disk 10 supporting at its periphery the rim 11 for mounting a tire (not shown). The central portion of the disk is deflected inwardly to form the annular flange 12 having the holes 13 for receiving bolts 14 for securing the wheel to the brake drum 15 forming part of the hub 16 which supports the wheel on its bearing spindle, a hub cap 17 being provided for engagement with the outer end of the hub in front of the nut which holds the wheel to the spindle.

The locking assembly comprises a keeper member 18 which may be stamped integral from sheet metal and which is of annular form to extend concentrically around the hub 16 and which has holes 19 for registering with the holes 13 in the wheel flange so as to receive the bolts 14 to be thereby secured, together with the wheel, to the brake drum. The keeper member has the forwardly extending peripheral flange 20 terminating in a flange 21 extending radially outwardly and cut away at regular intervals to leave locking or keeper tongues 22.

The locking cover 23 may be formed integral of sheet metal and has the central cup shaped portion 24 for receiving the outer end of the hub 16 and the hub cap 17. The peripheral inwardly extending flange 25 on the cover has portions deflected radially inwardly therefrom at regular intervals to provide locking tongues 26 which, after passage thereof rearwardly through the spaces between the keeper tongues 22 and then partial turning of the locking cover, will be behind the keeper tongues so as to hold the locking cover against axial outward movement. To release the cover, it must first be partially turned in reverse direction for release of the locking tongues from the keeper tongues, and I have provided improved lock mechanism for locking the cover against such releasing rotation so that the cover will be held securely locked to the keeper member 18.

The lock mechanism shown is of the tumbler or multiple disk type requiring manipulation in accordance with a proper combination for unlocking. The supporting frame or housing 27 for the lock disks is secured against the inner side of the cover 23 in approximately the circle of the wheel securing bolts. A pin 28 extends through the frame 27, this pin being surrounded by a sleeve 29 which extends from the inner wall of the housing through the opening 30 in the depressed portion 23' of the cover 23, the inner end of the pin 28 being riveted against the frame 27, while the outer end of the pin is riveted against the outer end of the sleeve 29, so that the pin and sleeve are held against rotation. Surrounding the sleeve and extending through the opening 30 is a connecting sleeve 31 which at its outer end receives the dial disk 32 and at its inner end receives the outer tumbler or combination disk 33. As shown on Figures 7, 8, and 9, the dial disk 32 has tongues 34, and the disk 33 has tongues 35 for engaging in slots 36 in the ends of the sleeve 31, so that the two disks are connected to the sleeve for rotational movement together on the bushing 29.

Any number of combination disks may be provided, three such disks being shown, the outer disk 33, the intermediate disk 37, and the inner disk 38. The disks 33, 37, and 38 have respectively the slots 39, 40, and 41 extending radially inwardly a distance from their peripheral edges. At a point displaced from the slot 39, the disk 33 has a portion deflected inwardly to provide an abutment 42. The second or intermediate disk 37 has an abutment 43 extending forwardly, and adjacent thereto an abutment 44 extending rearwardly, while the third or inner disk 38 has the abutment 45 extending forwardly. In the three disks, the abutments are at different distances from the respective slots, as clearly shown on Figures 8, 10, and 11. Upon turning of the dial disks in opposite directions, the abutments on the combination disks will cooperate to bring the slots therein into registration. To the person who knows the combination, the turning of the disk in opposite directions in accordance with the combination numbers will result in setting of the combination disks with their slots in registration. With the arrangement shown on Figures 7 to 11, the dial must be turned in counterclockwise direction for engagement of the rearwardly extending abutment 42 on the disk 33 with the forwardly extending abutment 43 on the disk 37 whose rearwardly extending abutment 44 will come into engagement with the forwardly extending abutment 45 on the disk 38, and the three disks would be rotated until the dial indicated the combination number, at which point the slot 41 of the disk 38 would be brought to the desired position. Then the dial would be rotated in clockwise direction for moving the disks 37 and 33 until the combination number on the dial is reached, when the notch 40 in disk 37 will come into registration with the notch 41 of the disk 38 which has already been set. Then the dial is again rotated in counterclockwise direction to the combination number, which will result in alignment of the slot 39 of the disk 33 with the slots of the set disks, so that all the slots will be in registration. The combination disks are held properly spaced apart by washers 46 which are preferably of the spring or friction type, and which are prevented from rotating by engagement of their keys in the keyway 48 provided in the bushing 29. In order that the setting dial 32 may be readily manipulated, it is provided with an outwardly extending arm 49 at the edge thereof.

Adjacent to one of the bolt receiving holes 19 in the keeper member 18, an L-shaped portion of the metal is deflected to extend outwardly at right angles from the keeper member, the longer leg 50 of this deflected portion being adapted to receive the slots 39, 40, and 41 in the combination disks when these slots are in registration. To strengthen and stiffen the part 50, the shorter leg 51 thereof is surrounded by a strap 52 which is secured at its ends to the keeper member, the arrangement being best shown on Figure 6. The lock frame 27 has a side opening 53 for receiving the end of the strap so that the locking member 50 may receive the disk notches.

When the wheel is to be locked, the notches on the combination disks should be in registration, the cover then being applied so that the locking member or plate 50 will receive the aligned notches in the locking disks, as shown on Figure 5, the locking tongues 26 on the cover being then in registration with the spaces between the keeper tongues 22. After the cover has been moved axially inwardly, it is then rotated in clockwise direction to bring the locking tongue 26 behind the keeper tongues 22 until further turning is prevented by engagement of the frame 27 with the head of the wheel securing bolt 14 directly to the left of the frame, as shown on Figure 4. After such turning movement, the notches in the locking disks will be clear of the locking plate 50, and the dial disk 32 is then turned for setting of the locking disks with their notches away from their registering position, so that the outer edge of the locking plate 50 will then be opposed to the solid portions of the peripheral edges of the locking disks, as shown on Figure 4. The locking cover is now held against turning movement in one direction by the bolt adjacent to the frame 27 and in the other direction by the locking plate 50, and as the locking tongues 26 are now behind the keeper tongues 22, the locking cover is securely locked to the keeper member 18, the cover and the keeper member then forming an enclosure for the wheel supporting bolts and the end of the hub and the hub cap, to frustrate access to these parts. To unlock the cover the dial disk is set in accordance with the proper combination to bring the locking disk slots into registration and opposite the end of the locking plate 50, and then the cover will be free for rotation, counterclockwise, for withdrawal of the locking tongues from the keeper tongues, and the cover may then be moved axially from the keeper member.

To hold the locking tongues snugly against the keeper tongues when the cover is locked and to prevent rattling, a spring 54 may be secured to the cover to abut the hub cap, as shown in Figures 1 and 2. The usual outer cover 55 may be mounted on the wheel to protect the locking assembly against dust, dirt, and the weather.

I have shown a practical and efficient embodiment of my invention, but I do not desire to be limited to the exact construction and arrangement shown and described, as changes and modifications may be made without departing from the scope of the invention.

I claim as follows:

1. Locking assembly for an automobile wheel of the type disclosed, comprising an annular keeper member adapted to be secured to the wheel structure by the bolts which secure the wheel to its supporting hub structure, keeper teeth extending radially from the peripheral portion of said keeper member, a locking cover shaped to receive the outer end of the wheel hub and to be positioned in front of the wheel supporting bolts to prevent access thereto, locking tongues on said locking cover adapted upon inward axial movement and then rotational movement of said cover structure for engagement behind said keeper tongues whereby said cover is held against outward axial movement, a locking disk rotatably mounted at the inner side of said cover to be rotatable from the outer side thereof, a locking plate on the keeper structure engageable by the edge of said locking disk to prevent rotational movement of said cover for release of its locking tongues from said keeper tongues, said locking disk having a radial notch to be brought into alignment with said locking plate upon turning of said disk whereby said cover may then be rotated for rotary movement for displacement of the locking tongues from the keeper tongues and axial removal of the cover from said keeper member.

2. A locking assembly for an automobile wheel of the type disclosed, comprising a keeper member having holes for receiving the bolts which secure the wheel to its supporting hub structure, a locking cover shaped to receive the outer end of the wheel hub and to project in front of the wheel securing bolts to prevent access thereto, means adapted upon axial and rotational movement of said locking cover relative to said keeper member for interlocking said cover and member against separation, a group of locking disks mounted coaxially on the rear side of said cover and each having a notch extending radially from the outer edge thereof, a dial disk on the outer side of said cover in coaxial alignment with said locking disks, a locking plate on said keeper member, and means whereby the rotation of said dial disk will selectively set said locking disks with their peripheral edges opposed to said locking plate whereby to prevent rotational movement of said cover, or to set said disks with their notches in alignment and in register with said locking plate whereby said cover may then be rotated for release from said keeper member.

3. A locking assembly for an automobile wheel of the type disclosed, comprising an annular keeper member surrounding the wheel hub and having holes for receiving the bolts which secure the wheel to the hub structure, a locking cover for enclosing the outer end of the wheel hub and to be disposed in front of said keeper member and the wheel securing bolts to prevent access to the bolts, means adapted upon rotary movement of said cover relative to said keeper member to lock said cover to the keeper member against axial withdrawal therefrom, a group of relatively rotatable lock disks mounted coaxially on the inner side of said cover and each having a locking slot extending radially inwardly from the peripheral edge thereof, a setting dial at the front of said cover secured to one of said lock disks to effect rotation thereof, a lock plate on said keeper member, and interconnections between said lock disks adapted upon selective turning of said dial to bring the lock disk notches into registration or out of registration with said lock plate, whereby when said disks are set with their notches out of registration said plate will be opposed to the peripheries of said disks to prevent unlocking rotation of said cover, and to be opposed to said notches when in registration to permit unlocking rotation of said locking cover.

4. In combination with an automobile wheel of the type disclosed, a locking assembly comprising an annular keeper member apertured to receive the wheel securing bolts to be thereby secured to the wheel, a locking cover receiving the outer end of the wheel hub and located to form with said keeper member an enclosure for the wheel securing bolts to prevent access thereto, cooperating means on said keeper member and cover adapted upon a partial rotary movement of said cover to lock said cover to the keeper member against axial removal therefrom, a group of coaxially relatively rotatable lock disks mounted on the rear side of said cover, a dial disk on the front of the cover connected with one of said lock disks to effect rotation thereof, interconnections between said lock disks for transmitting rotation of one disk to the other disk, said lock disks each having a notch extending radially inwardly from its peripheral edge, a lock plate on said keeper member, predetermined settings of said dial causing said disks to be rotated to bring their notches out of register with said lock plate whereby said lock plate will be opposed to the peripheral edges of said disks to prevent unlocking rotation of said cover, or to be set with their notches all in register with said locking plate to permit unlocking rotation of the cover.

GEORGE W. SCHATZMAN.